US006586673B1

United States Patent
Socarras

(10) Patent No.: US 6,586,673 B1
(45) Date of Patent: Jul. 1, 2003

(54) SERVICE LOOP TRAY AND ASSEMBLY FOR LOW VOLTAGE CABLES

(76) Inventor: Hernan F. Socarras, 88-09 35th Ave., Apt. 3N, Jackson Heights, NY (US) 11372

( * ) Notice: Subject to any disclaimer, the term of this patent is extended or adjusted under 35 U.S.C. 154(b) by 0 days.

(21) Appl. No.: 10/155,350

(22) Filed: May 24, 2002

(51) Int. Cl.⁷ .............................. H02G 3/04; H02G 3/08
(52) U.S. Cl. .......................... 174/50; 174/48; 174/68.1; 174/68.3; 385/134; 385/135
(58) Field of Search .............................. 174/50, 48, 49, 174/65 R, 68.3, 68.1, 71 R, 96, 97, 99 R, 135, 72 R; 385/134, 135, 100; D13/155; 248/68.1, 49, 51

(56) References Cited

U.S. PATENT DOCUMENTS

| | | | |
|---|---|---|---|
| 2,233,118 A | | 2/1941 | Williams .................. 193/38 |
| 2,860,742 A | | 11/1958 | Waters, Sr. et al. ............ 189/36 |
| 2,908,376 A | | 10/1959 | Sahagun .................. 198/33 |
| 3,717,319 A | | 2/1973 | Schultz et al. ................ 248/49 |
| 4,733,986 A | * | 3/1988 | Kenning et al. ............ 403/306 |
| 4,802,724 A | | 2/1989 | Fraize et al. ................ 356/96.2 |
| 4,886,336 A | | 12/1989 | Deusser et al. ............ 356/96.2 |
| 5,093,887 A | * | 3/1992 | Witte .................. 385/135 |
| 5,137,156 A | | 8/1992 | Riczinger et al. ............ 211/13 |
| 5,142,661 A | | 8/1992 | Grant et al. ................ 385/135 |
| 5,167,001 A | | 11/1992 | Debortoli et al. ............ 385/135 |
| 5,189,724 A | | 2/1993 | Hartley ................ 385/135 |
| 5,357,052 A | | 10/1994 | Hakeem .................. 174/48 |
| 5,639,048 A | * | 6/1997 | Bartholomew et al. ........ 248/49 |
| 5,913,487 A | * | 6/1999 | Leatherman ............ 242/378.4 |
| 5,969,292 A | * | 10/1999 | Snider et al. .................. 174/48 |
| 6,003,804 A | | 12/1999 | Vara .................. 242/400.1 |
| 6,129,316 A | * | 10/2000 | Bauer .................. 248/68.1 |
| 6,240,234 B1 | | 5/2001 | Falkenberg et al. ............ 385/136 |
| 6,245,998 B1 | | 6/2001 | Curry et al. ............... 174/72 A |
| 6,249,634 B1 | | 6/2001 | Tenney et al. ............... 385/135 |
| 6,263,141 B1 | | 7/2001 | Smith ................... 385/135 |
| 6,349,807 B1 | | 2/2002 | Northup et al. ................ 191/12 |
| 6,359,217 B1 | * | 3/2002 | Thompson et al. ............ 174/50 |
| 6,361,000 B1 | * | 3/2002 | Jette .............................. 365/66 |
| 6,363,198 B1 | * | 3/2002 | Braga et al. ................. 385/134 |
| 6,363,200 B1 | * | 3/2002 | Thompson et al. ......... 385/135 |
| 6,365,830 B1 | | 4/2002 | Snider, Jr. et al. ............. 174/48 |
| 6,367,730 B1 | | 4/2002 | Talamini, Sr. ............... 242/388 |
| 6,400,883 B1 | * | 6/2002 | Jennings et al. ............. 385/134 |
| 6,431,501 B1 | * | 8/2002 | Molek ....................... 248/68.1 |
| 6,448,497 B1 | * | 9/2002 | McCracken et al. .......... 174/97 |
| 6,480,660 B1 | * | 11/2002 | Reitmeier et al. .......... 385/135 |
| 6,483,033 B1 | * | 11/2002 | Simoes et al. ............ 174/72 A |
| 6,494,411 B1 | * | 12/2002 | Bjorklund ................... 248/49 |
| 6,501,899 B1 | * | 12/2002 | Marrs et al. ................ 385/135 |
| 2002/0038842 A1 | | 4/2002 | Adachi ........................ 248/49 |

* cited by examiner

Primary Examiner—Dean A. Reichard
Assistant Examiner—Angel R. Estrada
(74) Attorney, Agent, or Firm—Steven Horowitz

(57) ABSTRACT

Service loop tray assembly provides aesthetic organized service loop for a large or small amount of low voltage cables. In data center, a series of channel-shaped cable trays hold sets of cables. Each cable tray has a substantially u-shaped cross section and is mounted to a ladder rack at a series of junctures. The cable tray includes a substantially level service loop section, a cable access ramp and a cable drop lip, the service loop section connected to a cable access ramp and to a cable drop lip, the cable drop lip positioned to guide a first set of cables resting on the first cable tray into a data cabinet under the ladder rack containing termination points for cables. Cable access ramp of each cable tray rises sufficiently to avoid interference with a further set of cables that continues to a further cable tray at further junctures along ladder rack.

12 Claims, 5 Drawing Sheets

FIG. 3
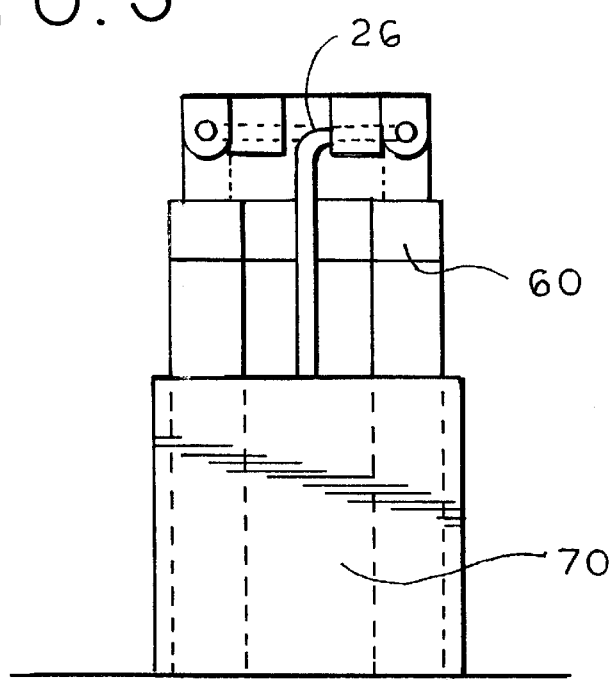
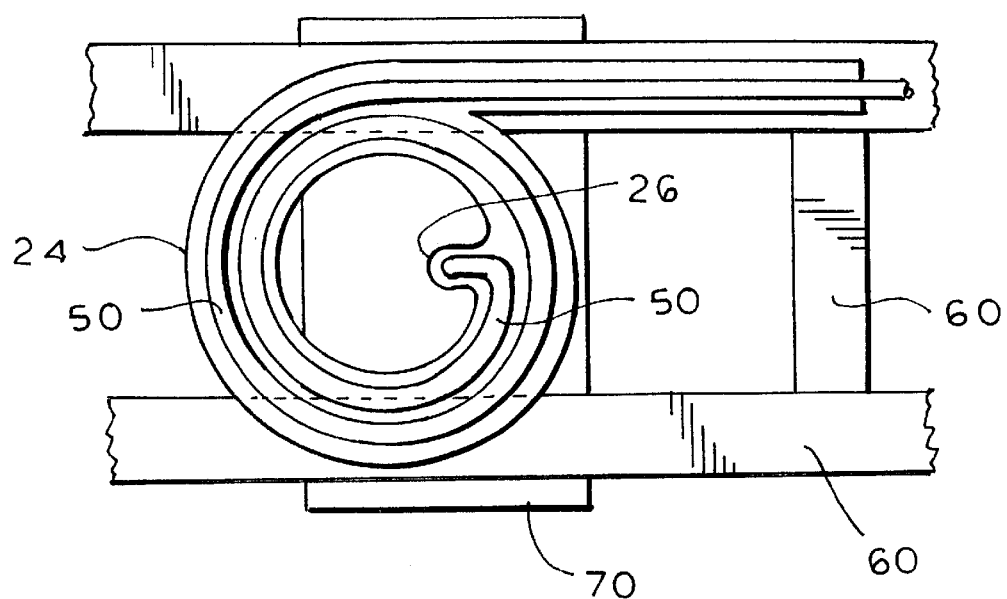
FIG. 4

SERVICE LOOP TRAY AND ASSEMBLY FOR LOW VOLTAGE CABLES

FIELD OF THE INVENTION

The field of this invention is cable trays for low voltage cables and more particularly cable trays that provide service loops.

BACKGROUND OF THE INVENTION AND DISCUSSION OF THE PRIOR ART

Low voltage cables are cables that carry approximately 48 volts or less, although in some contexts the definition might be more restrictive, i.e. 24 volts or less. This is distinguished from power cables that are used to supply high voltage electricity to operate something such as an appliance or lighting. A low voltage cable, in contrast, carries a low amount of voltage and its purpose is primarily to carry data. A low voltage cable carries an electrically conductive wire inside a jacket. An example of a low voltage cable is a Category 5 copper cable called in the industry "CAT 5 Copper". Another example is a Category 3 voice cable. Another example is a fiber optics cable. Even a video camera used for security would have a low voltage cable. A common example of low voltage cabling is the cables that run from computer work stations in an office. If the computers need to communicate with one another and to a server computer, then low voltage cables are used to connect them to the common server at the termination points. Telephone lines running from a phone in an office are also connected by low voltage cables to a common termination point.

The cables that run from work stations can number in the hundreds for large companies. Each of the cables emanating from a work station goes to termination points located in a data closet that could be in an out of the way area of the office on a wall between the visible drop ceiling and the "real" ceiling. For the remainder of this patent application, these situations are called "small applications", where the number of cables is not so large that they cannot terminate a simple data closet on a wall. "Large applications" shall refer to cabling done for large offices with large cables from large numbers of work stations or other sources of cables, where the termination points are so numerous and the cabling so bulky that the termination points are located in data cabinets located underneath ladder racks that are housed in a special room, called a data center, devoted exclusively to this purpose.

It is generally recognized that there is a need for a service loop at cable termination points. This means that there is a need for extra wire of each cable to be left at the termination point whose purpose is to make it easier to do service work, such as the rearrangement of the cabling, later. Suppose for example that there are cables 1 through 52 and they terminate in termination points which we arbitrarily label using the letters of the alphabet A through Z and then AA through ZZ. Normally cable 10 is plugged into termination point J and cable 40 is terminated at termination point NN. Suppose the client calls for service requiring a rearrangement of the computer lines such that cable 10 now needs to be plugged into termination point NN and that requires the re-cabling and re-matching of many other cables to different termination points. It would be much easier to perform the service request if a certain amount of slack were left over to do that. This called a service loop. The term "service loop" shall be defined in this patent application as any excess cable left for service or other future considerations.

Service loops are "industry standard" with respect to cabling done in the smaller applications where the termination points are located in a data closet usually attached to a wall above a drop ceiling. Accordingly, by industry standard if a service loop was not left at the termination point, the cabling job was shoddy and un professional. Even if a service loop was left, however, it does not necessarily mean the cable job was up to par. There are different ways to leave service loops. If the arrangement of the end of the cables is neat and efficient, that is considered fine. If the arrangement of the end of the cables is messy and totally disorganized and jumbled, the job was still done poorly. Empirically, the manner in which service loops are arranged at termination points in cabling jobs for the so-called smaller applications unfortunately tend to have two serious drawbacks.

The first drawback is that the service loop arrangement is typically tied together in a messy jumble which results in the cabling looking unprofessional and unappealing aesthetically. This is not simply an issue of abstract beauty. The cabling industry prides itself on organizing the cables well. A general contractor hired to build office space does not typically hire a company to do the cabling work for the office before seeing examples of the previous cabling work that company did. Aesthetics and how professional the job looks is central to an evaluation of the quality of the previous cabling work. In addition, for practical reasons, a general contractor would not want to see a cabling job revealing a messy service loop because it suggests a higher than desirable expected cost of future service in the likely event rearrangement of the cables is needed. Cabling is a labor intensive endeavor and labor typically runs $125 per hour, at least in New York City as of the time of the writing of this patent application.

The second drawback is that an excessive number of bends in a low voltage cable distorts the flow of data through the cable. When dealing with a large amount of cables that are together, the weight of the cables can be significant and can damage a particular cable if there is bending. If the cabling, meaning arranging the cables at their termination points, is not done properly it can damage the cables. Hence there is a strong need for aesthetically appealing and organized cabling at the termination point of the cables in smaller applications that terminate in a data closet.

Currently data closets do not have any support structure that permits a neat and efficient service loop to be left.

With respect to the very large applications that handle a large number of cables wherein data cabinets are lined up under ladder racks that run across a data center to accommodate hundreds of cables being terminated, service loops are simply omitted as a matter of course because it is understood that although service loops very beneficial, there is simply no room for them. Alternatively, service loops are left in the data cabinets under the ladder racks but they are haphazard and not neat because there is no support structure that makes it possible to leave a neat and efficient service loop.

It would advantageous to have a way to allow for a service loop to be left in the large cabling applications in data centers. In addition, for both larger and smaller applications, it would be advantageous for there to be a way in which it was easy to neatly and efficiently organize cables at their termination point with a service loop. Given the degree to which aesthetics, neatness and efficiency play a role in the cabling industry, having these advantages dramatically increase the value of a cabling company's appeal.

SUMMARY OF THE PRESENT INVENTION

The present invention address both of the aforementioned applications—larger and smaller—and solves the abovementioned problems as well as providing other advantages. The present invention features for the smaller applications a wall-mounted service loop tray for a data closet used to provide a service loop for a moderate amount of cables. The present invention also features for the larger applications a service loop tray assembly that provides an aesthetically appealing and highly organized service loop for a large amount of low voltage cables that terminate in a data cabinet in a data center. In the present invention, an assembly of cable trays is provided for the larger application which is essentially an unconnected plurality of individual cable trays similar to the ones that are featured for the smaller application.

In a data center, a series of channel-shaped cable trays hold sets of cables that are resting on ladder racks having data cabinets positioned underneath the ladder racks at a series of junctures along the ladder rack. In a main embodiment each cable tray has a substantially u-shaped cross section. The cable tray is mounted to the ladder rack at opposite sides of the ladder rack and each of the cable trays includes a substantially level service loop section, a cable access ramp and a cable drop lip. The service loop section is connected to a cable access ramp and to a cable drop lip. Each cable drop lip is situated so as to turn and guide each set of cables into the particular data cabinet to terminate the cables. The cable access ramp of each cable tray rises sufficiently to avoid interference between the service loop section of the first cable tray and the next set of cables that passes the first cable tray and continues to the next cable tray at a further juncture along the ladder rack.

IMPORTANT OBJECTS AND ADVANTAGES

The following important objects and advantages of the present invention are:

(1) to provide an apparatus for arranging neatly and in an organized way a large amount of low voltage cables adjacent their termination points;

(2) to provide an aesthetically appealing apparatus for arranging a large amount of low voltage cables adjacent their termination points;

(3) to provide a cabling tray assembly that provides for a service loop when cabling low voltage cables that terminate from ladder racks into data cabinets in a data center;

(4) to provide a cable tray for service loops comprised of a cable access ramp, a cable drop dip and a cable service loop section (5) to provide a cable tray assembly having a series of cable trays for use on ladder racks in data centers wherein the cable access ramp of one cable tray in the assembly does not interfere with the next set of cables that continues to the adjacent cable tray;

(6) to prevent damage to cables from unnecessary bending stemming from a messy cabling job;

(7) to provide a cable tray and a cable tray assembly that can be used for any low voltage cable; and (8) to provide a cable tray and cable tray assembly that can be used for any amount of cables (9) to provide a cable tray and a cable tray assembly that is of very simple construction and is easy to manufacture

BRIEF DESCRIPTION OF THE DRAWINGS

FIG. 3 is a vertical end sectional view of the assembly of cable trays of the present invention taken along line 3—3 of FIG. 2.

FIG. 4 is a fragmentary plan view similar to FIG.1 but where the service loop section of the cable tray has a double loop revolution.

DETAILED DESCRIPTION OF THE PREFERRED EMBODIMENT

Figure 1:
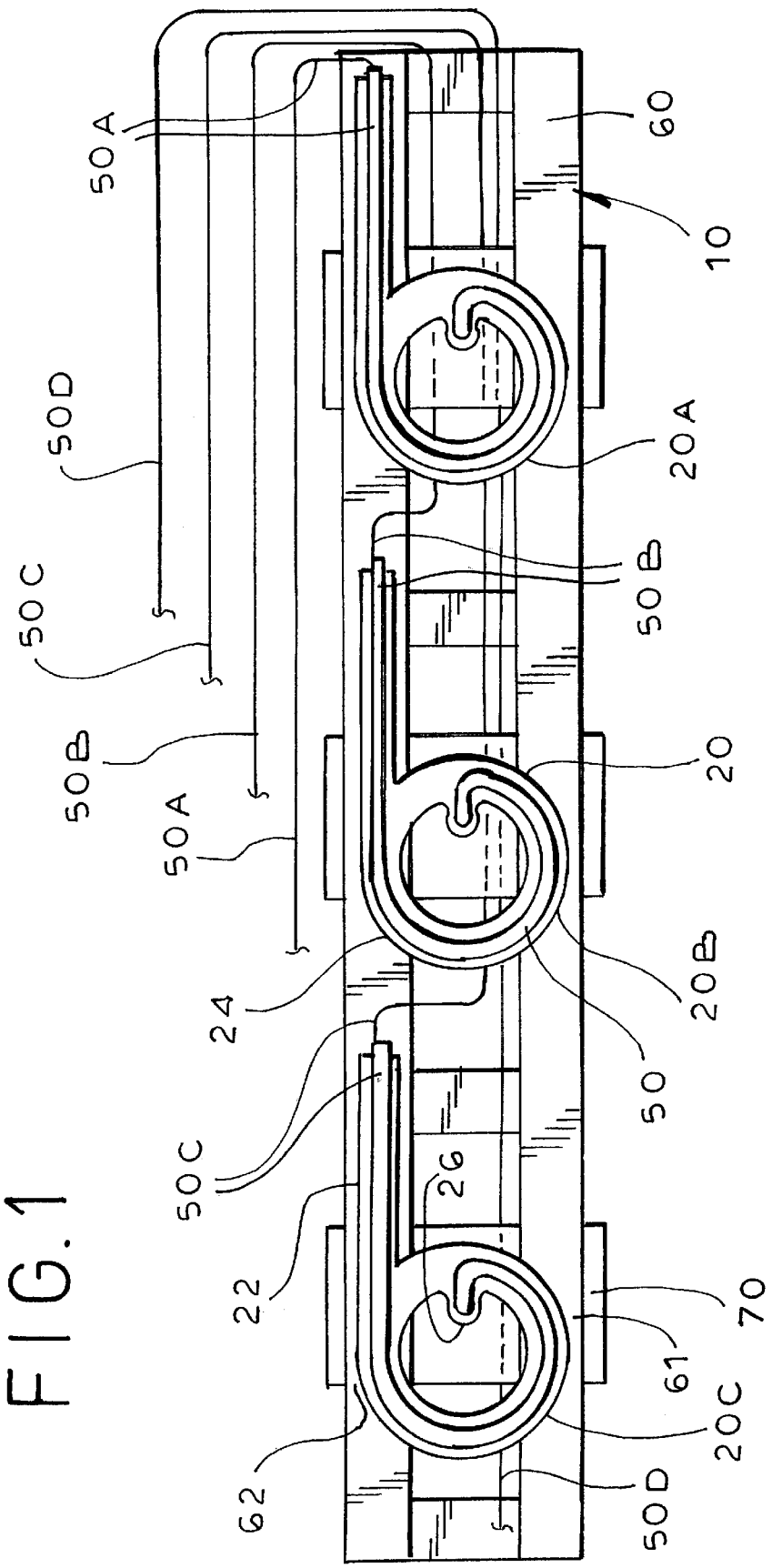
FIG. 1 is a top plan view of an assembly of cable trays of the present invention wherein the cables outside the cable trays are shown schematically.

The apparatus of the present invention will now be illustrated by reference to the accompanying drawings. The service loop tray assembly of the present invention has been assigned reference numeral 10 and the individual service loop cable trays forming part of the assembly have been assigned reference numeral 20A, 20B, 20C, etc. Other elements have been assigned the reference numerals referred to below.

As seen from FIGS. 1–5, an assembly 10 of service loop cable trays is shown which is useful in cabling large amounts of cables that rest on ladder racks and terminate into data closets in a data center. The cable tray assembly 10 includes a series of channel-shaped cable trays 20 that are not attached to one another but are individually mounted to the same ladder rack 60 in the data center. Each cable tray 20 in the assembly 10 is for neatly and efficiently holding and providing a service loop for a set of cables 50 that enters the data center and rests on the ladder rack 60. A particular set of cables 50 continues along the ladder rack until it reaches the cable tray 20 whereupon the set of cables 50 enters the cable access ramp 22 of the cable tray 20, continues through the cable service loop section 24 of the cable tray 20 and turns upward or downward as it follows the shape of the cable drop lip 26 of the cable tray 20.

Figure 2:
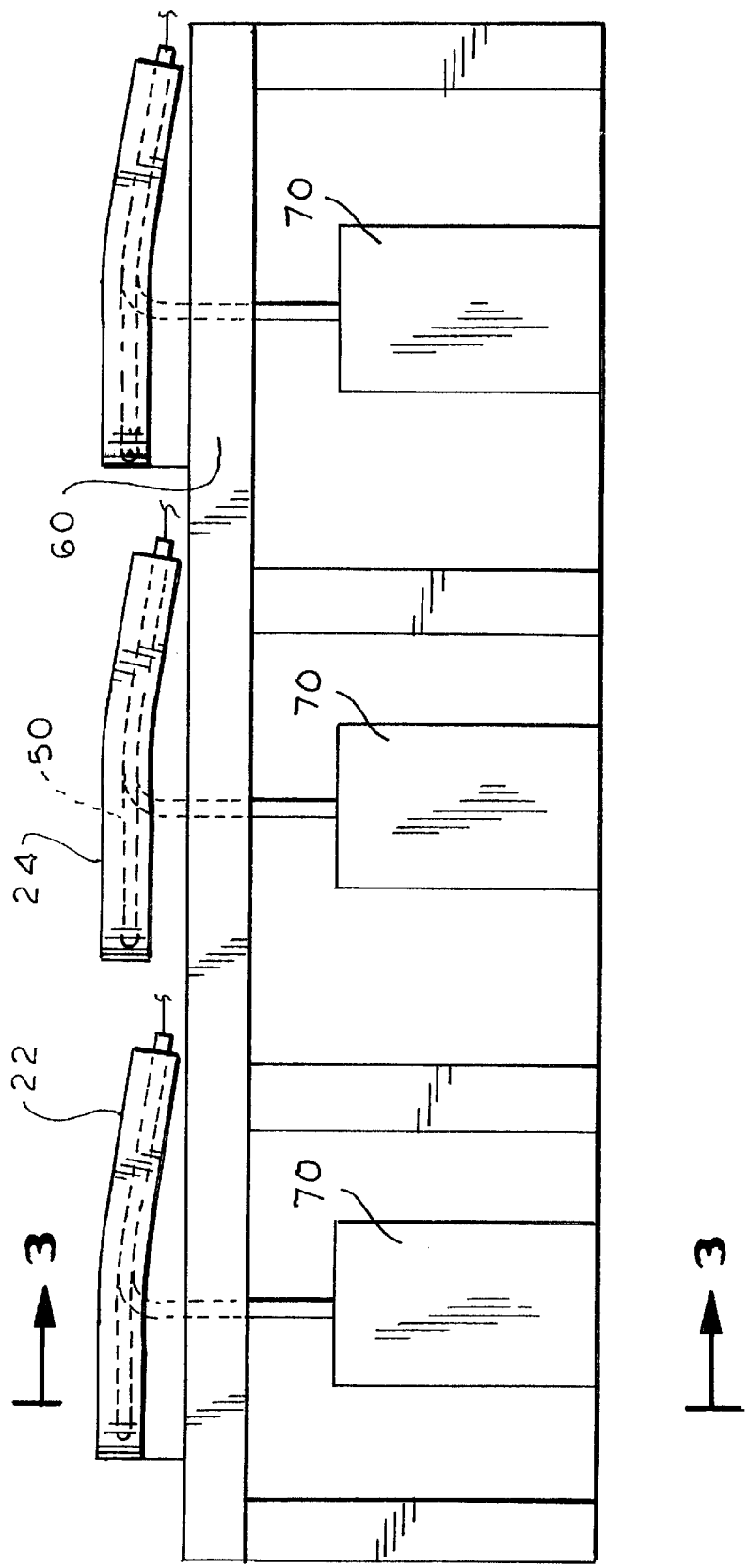
FIG. 2 is a side elevation view of FIG. 1.

The cable drop lip 26 turns toward data cabinet 70 and thereby directs the cables 50 into a data cabinet 70 located under or above the ladder rack 60. However, on the same ladder rack 60 there is a further, or in fact many further, sets of cables 50A, 50B, 50C, with each set containing perhaps dozens of cables. The second set of cables 50B, also called the further set or next set of cables, continues along the ladder rack 60 to a point further along the ladder rack 60 than the location of the first cable tray 20A and continues it meets the second cable tray 20B on the same ladder rack 60. To be able to do this, the second set of cables 50B must not be blocked by the cable access ramp 22 of the first cable tray. The second set of cables 50B is not in fact blocked because of the fact that the cable access ramp 22 of the first cable tray 20A rises sufficiently to avoid causing a blockage. The phrase "rises [or rising] sufficiently" as used in this patent application obviously does not refer to any actual motion of the cable access ramp 22 but rather to the rising location of ramp 22 in a pictorial frame of reference captured by a viewer looking at said ramp 22 from the side, as best seen in FIG. 2. The same thing happens to a third set of cables 50C that continues to a third cable tray 20C on the ladder rack 60 and so on as to any number of sets of cables and any number of cable trays 20 in the assembly of cable trays 20 along a single ladder rack 60. Each set of cables 50 is guided by a particular cable tray 20 to a particular and different data cabinet 70 under the ladder rack 60 at a different juncture of the ladder rack 60. For each ladder rack 60 in the data center, there is a separate assembly of cable trays 20 as described.

Each cable tray 20 in the cable assembly 10 has a substantially u-shaped cross section or alternatively each cable tray 20 has a floor and a left side wall and right side wall wherein the cable tray 20 is still substantially u-shaped but more of a rectangular "U". Each cable tray 20 in the cable tray assembly 10 is mounted by well known means (mounting means itself not shown) to the ladder rack 60 at two opposite points 61, 62 that are on opposite sides of the ladder rack. The cable trays 20 rests on a series of junctures along the ladder rack 60. The cable tray 20 include three parts: a substantially level service loop section 24 (also called a "cable service loop section"), a cable access ramp 22 and a cable drop lip 26. Preferably, although not necessarily, the service loop section 24 is substantially parallel to ladder rack 60 so that when ladder rack 60 is horizontal then service loop section 24 is substantially horizontal. The service loop section 24 is the middle of the three parts of the cable tray 20. Therefore, the cable service loop section 24 has a first end connected to a cable access ramp 22 and a second end connected to a cable drop lip 26. The service loop section 24 is typically one or two full revolutions of cabling but it can be something in between or even more than two revolutions. Preferably the service loop section 24 should contain cabling running through at least approximately one full revolution, i.e. 360 degrees of rotation, or at least most of said one revolution. The examples shown in FIGS. 1–4 and FIGS. 6–7 happen to depict cable trays 20 having substantially one revolution in their service loop section 24.

The service loop section 24 is preferably substantially round or substantially oval. The entire cable tray 20 can be made of any durable material such as metal, rigid plastic or wood. The cable tray 20 may optionally contain ventilation holes (not shown) in any section of the cable tray 20. The diameter of the service loop section 24 of the cable trays 20 in the assembly 10 may vary depending upon the requirements for the service loop, whether the standard amount of service loop is being requested or a customized variation requested. While for larger applications on ladder racks 60 there is a service loop required by industry standard, the service loops are not neat and efficient so presently there is no standard size for the service loops. However, it is believed that with the advent of the present invention a standard size for the service loop in the large applications will emerge.

The cable drop lip 26 of each cable tray 20 turns so as to guide the particular set of cables 50 that run through and rest on the cable tray 20 either downwardly into a data cabinet 70 located under the ladder rack 60 or upwardly into a data cabinet 70 located above the ladder rack 60. Although the cable drop lip 26 can extend either upwardly or downwardly, the cable drop lip 26 should preferably shift the direction of the cables by approximately ninety degrees, typically from a horizontal position to a vertical position. The cable drop lip 26 thus turns from the plane that the service loop section 24 lies in to a direction that is substantially perpendicular to this plane. Cable drop lip 26 may also vary in length depending upon the standard or custom specifications. It should be noted that while cable drop lip 26 turns the cables by approximately ninety degrees, it does not do so suddenly with a sharp turn but rather with a gradual turn in order to avoid bending. Thus, the turn that the cable drop lip 26 makes is called in the industry a "sweep ninety". This application will use the term "gradually turn approximately ninety degrees" to indicate a turn that is substantially a "sweep ninety" turn or is a turn sufficiently close in gradualism to a sweep ninety turn that the cables in cable tray 20 at or near the point of the turn are not damaged from the turn.

The data cabinet 70 contains termination points for the cables. Typically, the data cabinet 70 also contains the server computer, traffic switches, hub and other equipment.

As explained, the cable access ramp 22 of a particular cable tray 20, for example cable tray 20A, rises sufficiently so as to avoid interference (by the service loop section 24) with a further set of cables 50 that comes past it and continues to a further cable tray 20B in the assembly of cable trays 20 at a further juncture along the ladder rack 60. The service loop tray assembly 10 organizes and providing aesthetic service loops for the cables.

In an alternative embodiment, the cable tray 20 would have no cable access ramp 22. In this case, the cables 50 would enter the service loop section 24 directly. Everything else would be the same. This alternative embodiment applies to the cable trays 20 of the smaller application as well as the cable tray assembly 10 of the present invention for the large applications.

Figure 5:
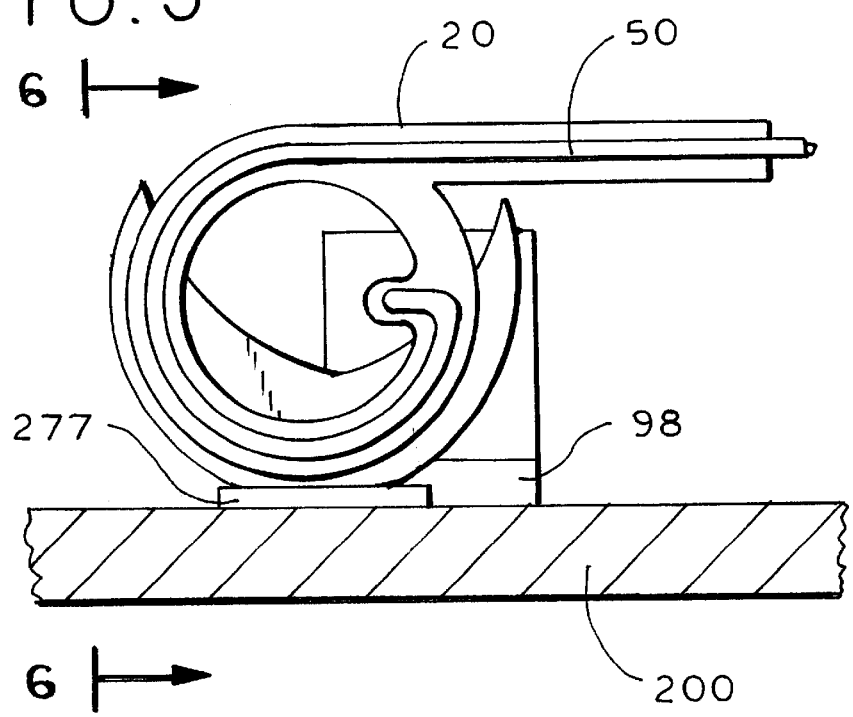
FIG. 5 is a top plan view of a wall mounted cable tray of the present invention.
Figure 6:
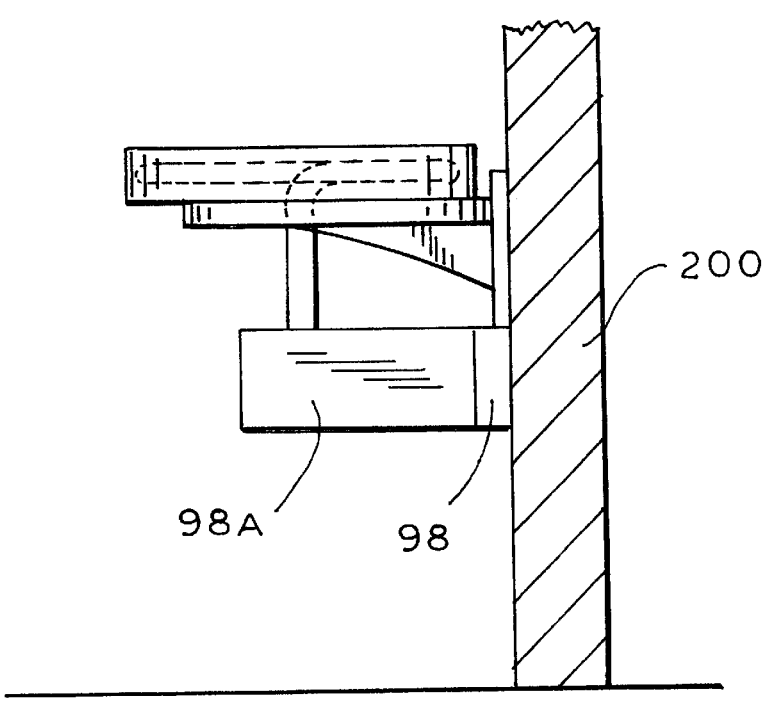
FIG. 6 is a vertical view taken along line 6—6 of FIG. 5.
Figure 7:
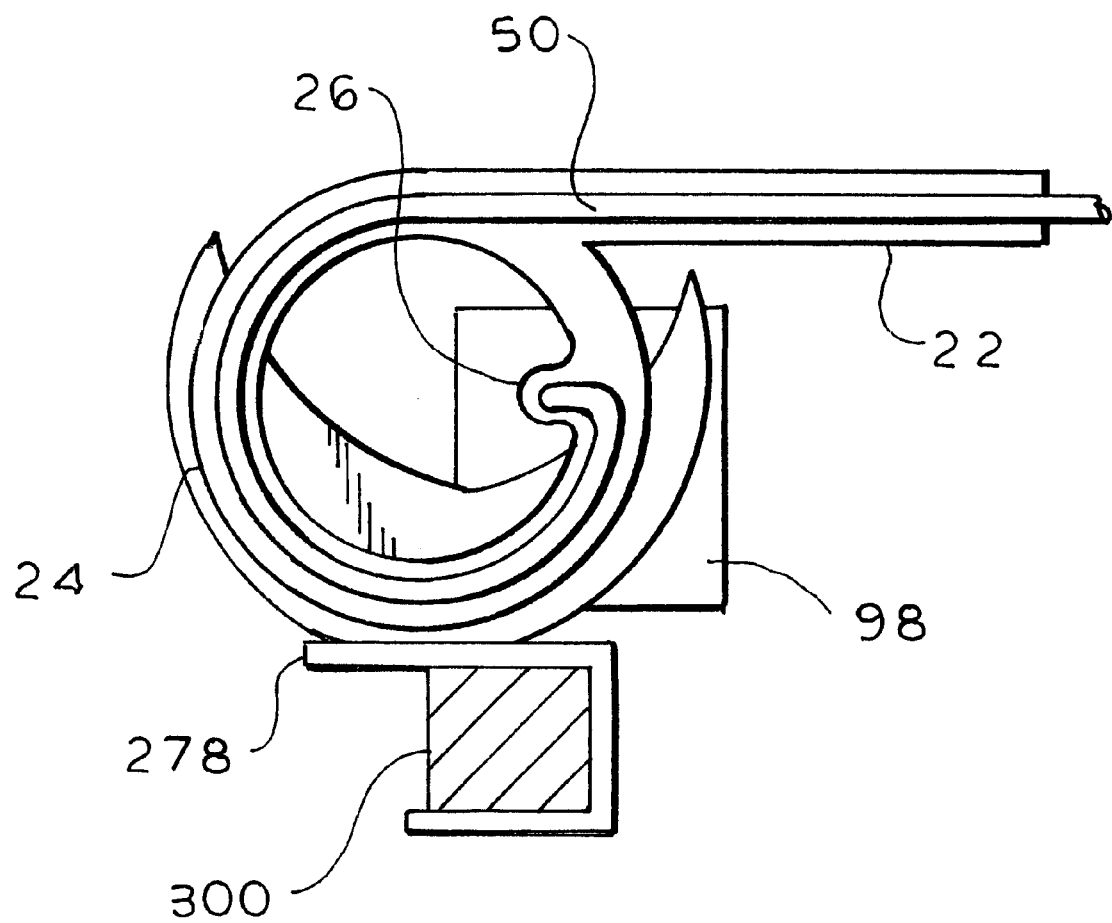
FIG. 7 is a top plan view of a stud mounted cable tray of the present invention.

In the application involving a relatively small amount of cables, the cables 50 terminate in a data closet 98 in a wall 99 typically between a drop ceiling and an upper ceiling. This is best seen in FIGS. 5–7 wherein the only difference is that FIGS. 5–6 shows a wall mounted version whereas FIG. 7 shows the cable tray 20 mounted to a stud (the "stud" referred to is the upright in the framing of a wall). The cable tray 20 of the present invention is the same for this smaller application as any of the individual cable trays 20 of the cable tray assembly 10 of the present invention with the exception that the cable tray 20 for the smaller application would be mounted to a wall 200 instead of to a ladder rack 60 in a data center. In the smaller application, moreover, the cables 50 coming off the cable drop lip 26 do not run into a data cabinet 70 below a ladder rack 60—instead they just run into a data closet 98 on the wall. Data closet 98 can have an extension 98A to add to the stability of the wall mounted unit. In addition, in the small applications, the service loop section 24 of cable tray 20 cannot be parallel to a ladder rack but it lies in a single plane. The service loop section 24 may be parallel to the wall or the ceiling depending upon how the cable tray 20 is mounted.

In the smaller application, the entire cable tray 20 may be mounted to the wall but may also be mounted to the ceiling or to a stud behind the wall.

In the smaller applications, the term "service loop cable tray" or "service loop tray" is sometimes used to refer to the cable tray 20. In the smaller applications, like in the large applications, cable tray 20 is for neatly and efficiently holding and providing a service loop for a bundle of cables 50 that enters the area where the data closet 98 is located on the wall. The bundle of cables 50a reaches the cable tray 20 whereupon the cables 50 enter the cable access ramp 22 of the cable tray 20, continue through the cable service loop section 24 of the cable tray 20 and make a sweep ninety turn upward or downward as it follows the shape of the cable drop lip 26 of the cable tray 20. Then the cables 50 run into the data closet 98 on the wall.

In both the wall and stud mounted versions bracket 277 and stud bracket 278 have been shown to assist in the mounting. It should be noted in particular with respect to the wall and stud mounted version that the means of mounting shown in the drawings are one way of embodying the idea of the invention and other ways of mounting the cable tray to the wall 200 or to a stud 300 can be envisioned using well known information.

It should be noted that whether for the larger or the smaller applications, the number of cables that are running through a single cable tray 20 can vary but in general terms, such amount has been called a "large" amount of cables simply because it would be atypical for only a handful of cables to be routed in one cable tray 20.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A service loop cable tray for organizing a large amount of low voltage cables that terminate in a data closet in an aesthetically appealing arrangement, comprising:
    a channel-shaped cable tray, the cable tray having a floor, a left side wall and a right side wall,
        the cable tray including a service loop section, a cable access ramp and a cable drop lip,
        the service loop section lying substantially in a plane and having a first end connected to the cable access ramp and a second end connected to the cable drop lip,
        the cable drop lip shaped to gradually turn approximately ninety degrees from the plane that the service loop section lies in and to guide a large amount of cables resting on the tray into a plurality of termination points located in the data closet,
        the service loop tray being mounted to a wall near the data closet.

2. The service loop cable tray of claim 1, wherein the service loop section is substantially round.

3. The service loop cable tray of claim 1, wherein the service loop section is substantially oval.

4. A service loop cable tray for organizing a large amount of low voltage cables that terminate in a data closet in an aesthetically appealing arrangement, comprising:
    a channel-shaped cable tray, the cable tray having a substantially u-shaped cross-section,
        the cable tray including a substantially level service loop section, a cable access ramp and a cable drop lip
        the service loop section lying in a plane and having a first end connected to the cable access ramp and a second end connected to the cable drop lip,
        the cable drop lip shaped to gradually turn approximately ninety degrees from the plane that the service loop section lies in and to guide a large amount of cables resting on the tray into a plurality of termination points located in the data closet,
        the service loop tray being mounted to a wall near the data closet.

5. The service loop cable tray of claim 4, wherein the service loop section is substantially round.

6. The service loop cable tray of claim 4, wherein the service loop section is substantially oval.

7. A service loop tray assembly for providing aesthetic and organized service loops for a large amount of low voltage cables resting on ladder racks in a data center, comprising:
    an assembly of channel-shaped cable trays for holding a plurality of sets of cables that enter the data center and rest on a ladder rack, each cable tray having a floor and left and right side walls, each cable tray mounted to the ladder rack at two points on opposite sides of the ladder rack, the cable trays resting at a series of junctures along the ladder rack,
    each cable tray in the assembly including a service loop section, a cable access ramp and a cable drop lip,
    the service loop section lying in a plane and being substantially parallel to the ladder rack and having a first end connected to the cable access ramp and a second end connected to the cable drop lip,
    the cable drop lip of a first cable tray shaped to gradually turn approximately ninety degrees from the plane of the service loop section and to guide a first set of cables resting on the first cable tray into a data cabinet under the ladder rack containing termination points for the cables,
    the cable access ramp of each cable tray rising sufficiently so as to avoid interference with a further set of cables that continues to a further cable tray in the assembly of cable trays at a further juncture along the ladder rack.

8. The service loop tray assembly of claim 7, wherein the service loop section of each cable tray is substantially round.

9. The service loop tray assembly of claim 7, wherein the service loop section of each cable tray is substantially oval.

10. A service loop tray assembly for providing aesthetic and organized service loops for a large amount of low voltage cables resting on ladder racks in a data center, comprising:
    an assembly of channel-shaped cable trays for holding a plurality of sets of cables that enter the data center and rest on a ladder rack, each cable tray having a substantially u-shaped cross-section, each cable tray mounted to the ladder rack at two points on opposite sides of the ladder rack, the cable trays resting at a series of junctures along the ladder rack,
    each cable tray in the assembly including a service loop section, a cable access ramp and a cable drop lip,
    the service loop section lying in a plane and being substantially parallel to the ladder rack and having a first end connected to the cable access ramp and a second end connected to the cable drop lip,
    the cable drop lip of a first cable tray shaped to gradually turn approximately ninety degrees from the plane of the service loop section and to guide a first set of cables resting on the first cable tray into a data cabinet under the ladder rack containing termination points for the cables,
    the cable access ramp of each cable tray rising sufficiently so as to avoid interference with a further set of cables that continues to a further cable tray in the assembly of cable trays at a further juncture along the ladder rack.

11. The service loop tray assembly of claim 10, wherein the service loop section of each cable tray is substantially round.

12. The service loop tray assembly of claim 10, wherein the service loop section of each cable tray is substantially oval.

* * * * *